US006483420B1

(12) United States Patent
Takahashi et al.

(10) Patent No.: US 6,483,420 B1
(45) Date of Patent: Nov. 19, 2002

(54) CIRCUIT BREAKER

(75) Inventors: Hideo Takahashi, Shizuoka-ken (JP); Noboru Yamaguchi, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 22 days.

(21) Appl. No.: 09/630,723

(22) Filed: Aug. 2, 2000

(30) Foreign Application Priority Data

Aug. 3, 1999 (JP) .......................................... 11-220155

(51) Int. Cl.$^{7}$ ......................... H01H 39/00; B60K 28/14

(52) U.S. Cl. ....................... 337/401; 337/407; 337/408; 180/274; 180/279; 361/45

(58) Field of Search ................................ 337/401, 157, 337/404–409, 119; 307/9.1–10.8; 180/271, 274, 279, 281–283; 200/61.08; 361/115

(56) References Cited

U.S. PATENT DOCUMENTS

| | | | | | |
|---|---|---|---|---|---|
| 3,660,794 | A | * | 5/1972 | Brizzolara | 337/401 |
| 3,786,388 | A | * | 1/1974 | Sato | 337/198 |
| 3,873,786 | A | * | 3/1975 | Lagofun | 200/61.08 |
| 3,915,236 | A | * | 10/1975 | Stichling | 169/26 |
| 3,931,602 | A | * | 1/1976 | Plasko | 337/163 |
| 3,932,717 | A | * | 1/1976 | Dike et al. | 200/61.08 |
| 3,958,206 | A | * | 5/1976 | Klint | 337/160 |
| 4,224,487 | A | * | 9/1980 | Simonsen | 200/61.08 |
| 4,280,748 | A | * | 7/1981 | McHenney et al. | 439/621 |
| 4,311,890 | A | * | 1/1982 | Schroder | 200/61.08 |
| 4,352,082 | A | * | 9/1982 | Barry et al. | 337/407 |
| 4,417,519 | A | * | 11/1983 | Lutz | 102/263 |
| 4,720,759 | A | * | 1/1988 | Tabei | 200/83 P |
| 5,014,036 | A | * | 5/1991 | Komoto | 337/4 |
| 5,150,093 | A | * | 9/1992 | Gurevich | 337/163 |
| 5,254,967 | A | * | 10/1993 | Biasutti et al. | 337/164 |
| 6,194,988 | B1 | * | 2/2001 | Yamaguchi et al. | 180/279 |
| 6,275,136 | B1 | * | 8/2001 | Yamaguchi | 337/182 |
| 6,281,781 | B1 | * | 8/2001 | Yamaguchi | 337/182 |
| 6,281,782 | B1 | * | 8/2001 | Morimoto et al. | 337/182 |

FOREIGN PATENT DOCUMENTS

| | | | | | |
|---|---|---|---|---|---|
| JP | 56-20254 | | | 2/1981 | |
| JP | 64-29756 | | | 2/1989 | |
| JP | 1-133314 | A | * | 5/1989 | H01G/9/12 |
| JP | 10-55742 | A | * | 2/1998 | H01H/39/00 |
| JP | 10-211522 | A | * | 9/1998 | H01H/39/00 |
| JP | 10-241523 | A | * | 9/1998 | H01H/39/00 |
| JP | 10-241524 | A | * | 9/1998 | H01H/39/00 |
| JP | 10-310004 | A | * | 11/1998 | B60R/16/02 |
| JP | 10-324207 | A | * | 12/1998 | B60R/21/00 |

* cited by examiner

*Primary Examiner*—Anatoly Vortman
(74) *Attorney, Agent, or Firm*—Finnegan, Henderson, Farabow, Garrett & Dunner, L.L.P.

(57) ABSTRACT

When an ignitor 29 is ignited by an abnormal signal sent from outside, a heating agent 27 charged into a thermite case 26 is heated, a retainer 45 is melted by the heat, a compression spring 39*a* is expanded to allow the thermite case 26 to move up. Therefore, electrical connection between the thermite case 26 and each of a first bus bar 11*a* and a second bus bar 19*a* is interrupted. Thus, it is possible to reliably interrupt a circuit within a short time. Further, a low-melting metal 28 mounted to an intermediate portion of the second bus bar 19*a* is blown out by heat caused by a current flowing through the second bus bar 19*a* to interrupt the circuit. Therefore, even if an abnormal signal is not sent to the ignitor 29 due to failure of a control circuit or the like, it is possible to reliably interrupt the circuit.

14 Claims, 9 Drawing Sheets

CIRCUIT BREAKER

BACKGROUND OF THE INVENTION

1. Field of The Invention

The present invention relates to a circuit breaker for interrupting an electric circuit for a short time.

2. Description of The Related Art

In an electrical component system provided in a vehicle, when something is wrong with a load of a power window or the like, or when something is wrong with a wire harness or the like constituted by a plurality of electric wires connecting a battery and various loads to each other, a high-current fuse inserted between the battery and the wire harness is blown out to interrupt a connection between the battery and the wire harness, thereby preventing the loads, the wire harness and the like from being burnt and damaged.

However, in the case of the electric component system using such a high-current fuse, even if something is wrong with the load of the power window or the like, or something is wrong with the wire harness or the like connecting the battery and various loads, the fuse is not blown out unless a current equal to or greater than a tolerated value which is previously set for the high-current fuse. Therefore, various protecting apparatuses have been developed for detecting the current and interrupt the connection between the battery and the wire harness when a high current close to the tolerated value is continuously flowing.

FIG. 1 is a sectional view showing one example of the protecting apparatus using a bimetal (Japanese Utility Model Application Laid-open No. S64-29756). The protecting apparatus shown in FIG. 1 is made of insulation resin, and comprises a housing 103 formed at its upper portion with a fuse accommodating portion 102, a lid 113 for closing the fuse accommodating portion 102 such that the latter can be opened and closed, a power source terminal 105 disposed in a lower portion in the housing 103 such that an upper end of the power source terminal 105 projects into the fuse accommodating portion 102 and a lower end thereof is exposed outside, and the exposed portion of the power source terminal 105 being connected to a positive terminal of a battery 104, a load terminal 109 disposed in a lower portion in the housing 103 such that an upper end of the load terminal 109 projects into the fuse accommodating portion 102 and a lower end thereof is exposed outside, and the exposed portion of the load terminal 109 being connected to a load 108 through an electric wire 107 constituting a wire harness 106, a fusible member 110 made of low-melting metal disposed in the fuse accommodating portion 102, and having one end connected to an upper end of the power, source terminal 105 and the other end connected to an upper end of the load terminal 109, an intermediate terminal 111 disposed in a lower portion in the housing 103 such that the intermediate terminal 111 is located at an intermediate position between the power source terminal 105 and the load terminal 109 and a lower end of the intermediate terminal 111 is exposed outside, and the exposed portion being connected to a negative terminal of the battery 104, and a bimetal 112 which is made of a long plate-like member comprising two kinds of metal bonded together and which is disposed such as to be opposed to the fusible member 110 such that a lower end of the bimetal 112 is connected to an upper end of the intermediate terminal 111 and an upper end thereof being bent into an L-shape.

When an ignitor switch and the like of the vehicle are operated, and a current is flowing through a path comprising the positive terminal of the battery 104, the power source terminal 105, the fusible member 110, the load terminal 109, the electric wire 107 of the wire harness 106, the load 108, and the negative terminal of the battery 104, and when an abnormal condition occurs in the load 108 or in the wire harness 106 connecting the load 108 and a protecting apparatus 101, and a current equal to or greater than the tolerated value flows through the fusible member 110, the fusible member 110 is heated and blown out for protecting the load 108, the wire harness 106 and the like.

Further, even if something is wrong with the load 108 or the wire harness 106 connecting the load 108 and the protecting apparatus 101, and a large current flows through the fusible member 110, if the current does not exceed the tolerated value, the fusible member 110 is heated by the current flowing through the latter, and the bimetal 112 starts deforming. When a predetermined time is elapsed from the instant when the large current starts flowing through the fusible member 110, a tip end of the bimetal 112 comes into contact with the fusible member 110, and a large short-circuit current flows through the fusible member 110 in a path comprising the positive terminal of the battery 104, the power source terminal 105, the fusible member 110, the intermediate terminal 111, and the negative terminal of the battery 104, and the latter is blown out.

With the above structure, even when a current equal to or lower than the tolerated value flows for a preset time or longer, the circuit is interrupted to protect the wire harness 106 and the load 108.

As another protecting apparatus rather than this protecting apparatus 101, a protecting apparatus 121 shown in FIG. 2 has also developed (Japanese Utility Model Application Laid-open No. S64-29756).

The protecting apparatus 121 shown in FIG. 2 comprises a housing 122 made of insulation resin, a power source terminal 124 embedded in one side surface of the housing 122 and having a lower end connected to a positive terminal of a battery 123, and a load terminal 128 embedded in the other side surface of the housing 122 and having a lower end connected to a load 127 through an electric wire 126 constituting a wire harness 125. The protecting apparatus 121 further comprises an electric wire 131 including a fusible lead 129 which is made of low-melting metal and formed into U-shape and a heat-proof coating 130 formed such as to cover the fusible lead 129. The protecting apparatus 121 further comprises a coil 132. The coil 132 is made of shape-memory alloy which is formed into a shape wound around the electric wire 131 as shown in FIG. 2 when it is in a martensite phase state, and which is returned to its original phase shape fastening the electric wire 131 when it is heated to 120° C. to 170° C. The protecting apparatus 121 further comprises an external terminal 133 whose upper end is connected to one end of the coil 132 and whose lower end is connected to a negative terminal of the battery 123.

When an ignitor switch and the like of the vehicle are operated, and a current is flowing through a path comprising the positive terminal of the battery 123, the power source terminal 124, the fusible lead 129 of the electric wire 131, the load terminal 128, the electric wire 126 of the wire harness 125, the load 127 and the negative terminal of the battery 123, and when an abnormal condition occurs in the load 127 or in the wire harness 125 connecting the load 127 and a protecting apparatus 121, and a current equal to or greater than the tolerated value flows through the fusible lead 129, the fusible lead 129 is heated and blown out for protecting the load 127, the wire harness 125 and the like.

Further, even if something is wrong with the load 127 or the wire harness 125 connecting the load 127 and the protecting apparatus 121, and a large current flows through the fusible lead 129, if the current does not exceed the tolerated value, the fusible lead 129 is heated by the current flowing through the latter, and a temperature of the coil 132 rises. When a predetermined time is elapsed from the instant when the large current starts flowing through the fusible lead 129, and the temperature of the coil 132 rises to 120° C. to 170° C., the coil 132 changes from its martensite phase state to its original phase and bites into the heat-proof coating 130 which is softened by heat and comes into contact with the fusible lead 129, and a large short-circuit current flows through the fusible lead 129 in a path comprising the positive terminal of the battery 123, the power source terminal 124, the fusible lead 129, the coil 132, the external terminal 133, and the negative terminal of the battery 123, and the latter is blown out.

With the above structure, even when a current equal to or lower than the tolerated value flows for a preset time or longer, the circuit is interrupted to protect the wire harness 125 and the load 127.

FIG. 3 is a perspective view of a conventional fusible-link fusible conductor (Japanese Utility Model Application Laid-open No. S56-20254). This fusible-link fusible conductor 201 comprises a fusible conductor body 202 made of high-melting metal, and a fusible conductor piece 203 made of low-melting metal held on an intermediate portion of the fusible conductor body 202 through a pinching piece 202*a*, and a blowout characteristics are improved by dispersing low-melting metal and producing an alloy.

According to such a structure, if an excessive current flows through the fusible conductor body 202, the fusible conductor piece 203 is melted by heat caused by the excessive current, thereby blowing out the fusible conductor 201.

However, in the above-described conventional protecting apparatuses 101 and 121, there are problems as follows.

First, in the case of the protecting apparatus shown in FIG. 1, it is detected whether a large current flows through the fusible member 110 using the bimetal 112 made of two kinds of metals having different thermal expansion coefficients and bonded to each other. Therefore, if the magnitude of the current flowing through the fusible member 110, the bimetal 112 is deformed, and the time that elapsed before the circuit is interrupted is varied.

Thus, when a failure that a large current flows intermittently occurs, a temperature of the fusible member 110 does not rise more than a certain value, and there is an adverse possibility that the wire harness 106 or the load 108 may be burnt before the protecting apparatus 101 interrupts the circuit.

In the case of the protecting apparatus 121 shown in FIG. 2, it is detected whether a large current flows through the fusible lead 129 using the coil 132 made of shape-memory alloy. Therefore, if the magnitude of the current flowing through the fusible lead 129, the coil 132 is deformed, and the time that elapsed before the circuit is interrupted is varied.

Thus, when a failure that a large current flows intermittently occurs, a temperature of the fusible lead 129 does not raise more than a certain value, and there is an adverse possibility that the wire harness 125 or the load 127 may be heated excessively before the protecting apparatus 121 interrupts the circuit.

Further, in the protecting apparatuses shown in FIGS. 1 and 2, the heat reaction time of the bimetal 112 or the coil 132 which is a thermal-deformable electrical conduction member is varied depending upon the current flowing therethrough. Further, the heat reaction of the thermal-deformable electrical conduction member is not operated timely in some cases when an abnormal condition occurs (when excessive current flows).

In the case of the fusible conductor 201 shown in FIG. 3, the dispersion time of the low-melting metal is varied low-melting metal, it takes a long time for dispersing the low-melting metal and thus, the low-melting metal is not operated timely in some cases when an abnormal condition occurs (when excessive current flows).

Thereupon, as a circuit breaker which operates timely when an abnormal condition occurs (when excessive current flows), Japanese Patent Application No. H11-64055 (filed on Mar. 10, 1999) (not prior art) shows a circuit breaker. According to this circuit breaker, a pair of connecting terminals comprise a connecting terminal (e.g., buss bar) for a battery and a connecting terminal for a load. A conductor member (e.g., thermite case) is in contact with the pair of connecting terminals. When an abnormal condition of a vehicle occurs, the conductive member is moved upward by a compression spring or the like in response to an abnormal signal input from a control circuit or the like, thereby cutting off the electrical connection between the one connecting terminal and the other connecting terminal to interrupt the circuit.

However, this circuit breaker has problems that if a wire of the control circuit or the like may be broken, or if a current sensor or the like is damaged and the abnormal signal is not sent to the circuit breaker, the circuit can not be interrupted.

SUMMARY OF THE INVENTION

It is an object of the present invention to provide a circuit breaker capable of reliably interrupting a circuit in a short time to protect an electrical part when an abnormal signal of a vehicle is input, and capable of reliably interrupting the circuit even if the control circuit is out of order and the abnormal signal is not sent.

To achieve the above object, according to a first aspect of the present invention, there is provided a circuit breaker comprising: a first breaker including a first connecting terminal connected to a power source, a second connecting terminal connected to a load, and a conductive member coming into electrical contact with both the first and second connecting terminals, the first breaker moves the conductor member when a vehicle is under an abnormal condition to cut the electrical connection between the first and second connecting terminals, thereby interrupting a current; and a second breaker including a notch which is a fusible conductor formed on an intermediate portion of at least one of the first and second connecting terminals, the notch is blown out by heat caused by a current flowing through the at least one of the first and second connecting terminals, thereby interrupting the current, wherein a current is supplied from the power source to the load, and a circuit from the power source to the load is interrupted when the vehicle is under the abnormal condition.

According to the first aspect, the first breaker supplies a current to the load through the pair of connecting terminals comprising the first and second connecting terminals and the conductive member under a normal condition, and moves the conductive member based on the interrupting signal input when the vehicle is under the abnormal condition, thereby cutting off the electrical connection between the one connecting terminal and the other connecting terminal to interrupt the current. Therefore, it is possible to reliably interrupt the circuit within a short time.

Further, the second breaker includes the notch which is the fusible conductor formed on the intermediate portion of at least one of the first and second connecting terminals, and the notch is blown out by heat caused by the current flowing through the at least one of the first and second connecting terminals, thereby interrupting the current. That is, since the two kinds of circuit protecting members are provided, even when the interrupting signal is not input to the first breaker due to failure of a control unit or the like and the circuit can not be interrupted by the first breaker, the circuit can be interrupted by the second breaker, and an electrical part can be protected.

According to a second aspect of the invention, in the circuit breaker of the first aspect, the first breaker comprises a heating portion having the conductive member into which a heating agent is charged, an ignitor for igniting the heating agent by an interrupting signal, an outer case for accommodating the ignitor and the heating portion, an extensible resilient member, and a removable member for mounting the resilient member in its compressed state, the removable member being capable of being attached to and detached from the outer case, and being disposed in the vicinity or in contact with the heating portion when the removable member is mounted to the outer case, and the removable member is melted by heat caused by the heating agent.

According to the second aspect, the removable member for mounting the resilient member in its compressed state is disposed in the vicinity or in contact with the heating portion when the removable member is mounted to the outer case. When the ignitor ignited by the abnormal signal sent from outside, the heating agent charged into the heating portion is heated, and the removable member is melted by the heat. Since the resilient member which had been compressed is expanded to allow the heating portion to jump up, the electrical connection between the first and second connecting terminals is cut. Therefore, it is possible to reliably interrupt the circuit within a short time to protect the electrical part.

Further, since the removable member can be attached to and detached from the outer case, the attaching and detaching operation of the removable member is simple. Since the resilient member is held by the removable member, no external force is applied to the connected portion between the first and second connecting terminals and the heating portion.

According to a third aspect of the invention, in the circuit breaker of the second aspect, the second breaker comprises a low-melting metal as the fusible conductor.

According to the third aspect, since the low-melting metal is added as the fusible conductor, the low-melting metal is dispersed by the heat caused by the current flowing through the connecting terminal, the resistance is increased, thereby blowing out the fusible conductor to interrupt the circuit.

According to a fourth aspect of the invention, in the circuit breaker of the circuit breaker of the third aspect, the fusible conductor is mounted to the intermediate portion of at least one of the first and second connecting terminals by heat welding or caulking.

According to the fourth aspect, since the fusible conductor is mounted to the intermediate portion of at least one of the first and second connecting terminals by heat welding or caulking, the low-melting metal is dispersed by the heat caused by the current flowing through the connecting terminal, the resistance is increased, thereby blowing out the fusible conductor to interrupt the circuit.

According to a fifth aspect of the invention, in the circuit breaker of the third aspect, the interrupting signal is input to the first breaker when a value of the current became equal to or greater than a threshold value, and the value of the current when the fusible conductor is blown out is set greater than the threshold value.

According to the fifth aspect, since the interrupting signal is input to the first breaker when a value of the current became equal to or greater than a threshold value, and the value of the current when the fusible conductor is blown out is set greater than the threshold value, when the circuit can not be interrupted by the first breaker, the circuit can be interrupted by the second breaker, and the second breaker is not operated before the first breaker is operated.

According to a sixth aspect, in the circuit breaker of the second aspect, the heating portion is formed at its end with a side wall, the side wall and tip ends of the first and second connecting terminals are connected to each other by low-melting members.

According to the sixth aspect, since the side wall and tip ends of the first and second connecting terminals are connected to each other by low-melting members, if the removable member and the low-melting metal are melted by the heat of the heating agent, the heating portion jumps up to interrupt the electrical connection between the first and second connecting terminals. Therefore, it is possible to reliably interrupt the circuit within a short time to protect the electrical part. Further, since no spring force is applied to the low-melting metal which is the connected portion between the first and second connecting terminals and the heating portion, it is possible to enhance the reliability of the connected portion.

DESCRIPTION OF THE PREFERRED EMBODIMENT

Embodiments of a circuit breaker of the present invention will be explained in detail with reference to the drawings.

Figure 1:
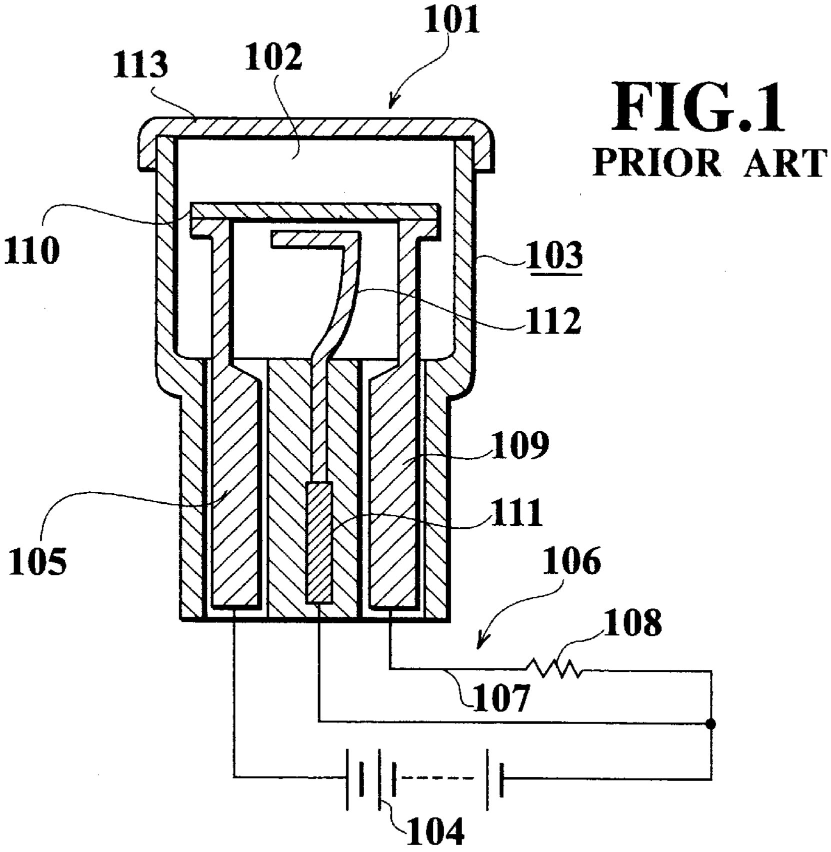
FIG.1 PRIOR ART
FIG. 1 is a sectional view showing one example of a conventional protecting apparatus using a bimetal.
Figure 2:
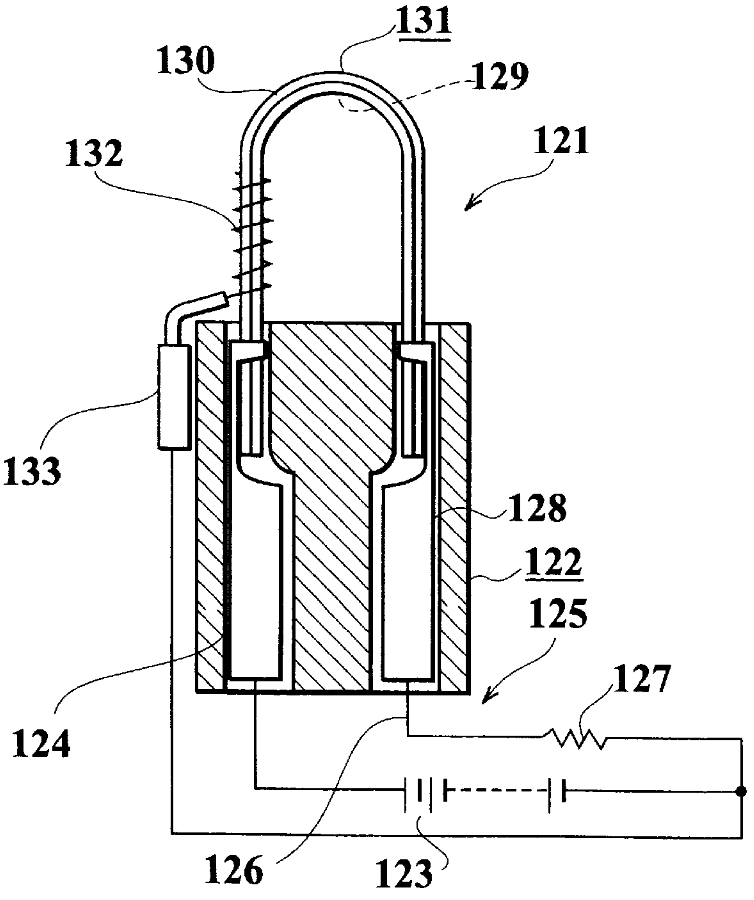
FIG.2 PRIOR ART
FIG. 2 is a sectional view showing another example of the conventional protecting apparatus.
Figure 3:
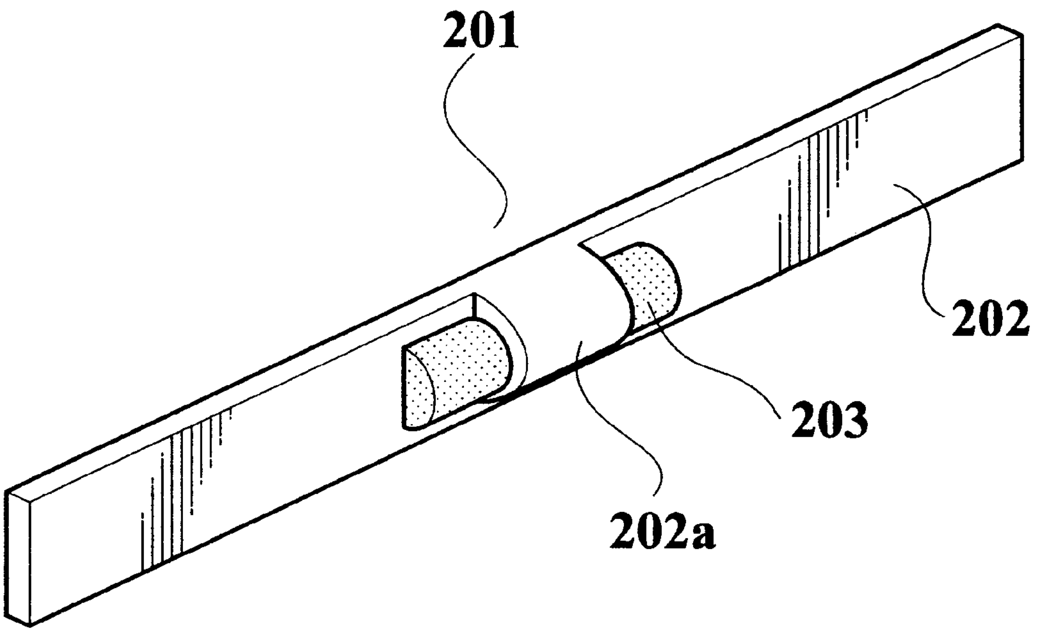
FIG.3 PRIOR ART
FIG. 3 is a perspective view of a conventional fusible-link fusible conductor.
Figure 4A:
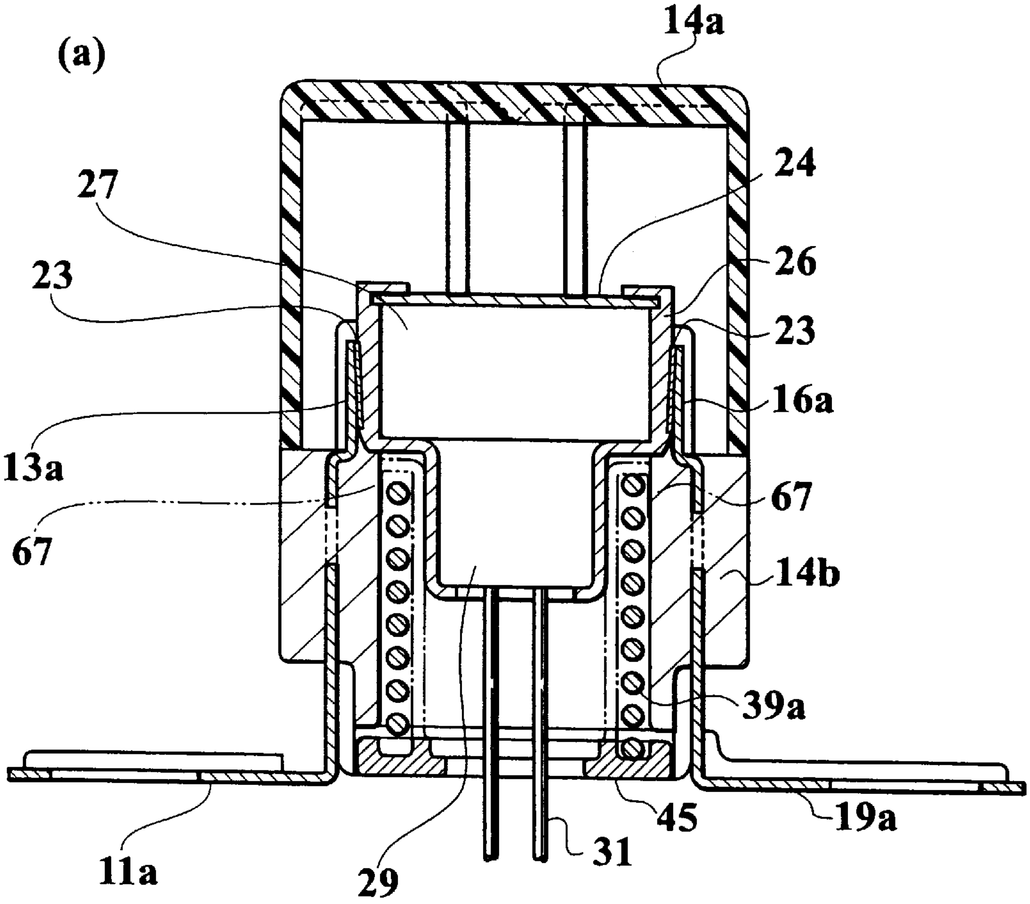
FIGS. 4A and 4B are sectional views of a circuit breaker of an embodiment before a circuit is interrupted.

First, a structure of a first breaker will be explained. In FIG. 4A, a plate-like long first buss bar 11*a* is made of copper or copper alloy for example, and is connected to a battery (not shown) or the like. A plate-like long second buss bar 19*a* is also made of copper or copper alloy for example, and is connected to a load (not shown) or the like.

Figure 5:
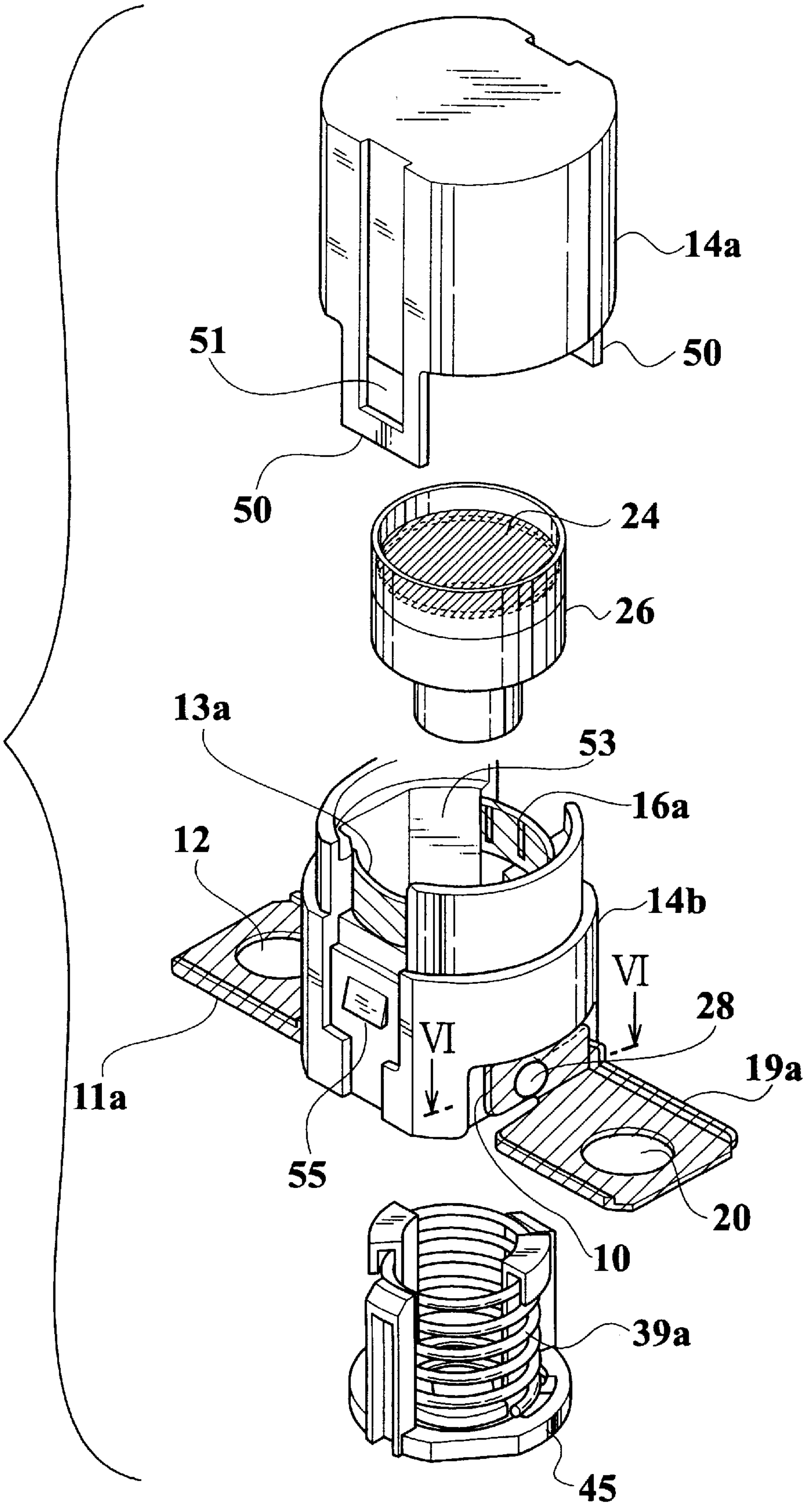
FIG. 5 is an exploded perspective view of the circuit breaker of the embodiment.

In FIG. 5, a cap 14*a* is formed with an extended portion 50 having a rectangular groove 51. A resin case 14*b* is formed with a wedge-like locking portion 55. If the groove 51 is fitted to the locking portion 55, the cap 14*a* is put on the resin case 14*b*. The cap 14*a* and the resin case 14*b* constitute an outer case, and comprise container made of insulation material such as resin (thermoplastic resin).

The resin case 14*b* is formed with an opening 53 into which a cylindrical thermite case 26 is accommodated. A heating agent 27 and an ignition 29 to which a lead wire 31 is connected are accommodated in the thermite case 26. An upper lid 24 is put on an upper portion of the heating agent.

The thermite case 26 has excellent thermal conductivity, and is not melted by heat of the heating agent 27. It is preferable to use brass, copper, copper alloy, stainless steel or the like as material of the thermite case 26. The thermite case 26 is formed by restriction working or the like of metal, and is shaped into a cylindrical or rectangular parallelepiped shape.

The ignition 29 includes an igniting agent so that the igniting agent is ignited by heat generated by a current flowing through the lead wire 31 when an abnormal condition occurs in the vehicle such as collision accident of the vehicle, thereby allowing the heating agent 27 to generate the thermite reaction heat.

The first buss bar 11*a* having a circular hole 12 and the second buss bar 19*a* having a circular hole 20 are bent upward at right angles, the bent portions are inserted into the resin case 14*b*, and bus bar tip ends 13*a* and 16*a* are respectively in contact with left and right side walls of the thermite case 26 through low-melting metals 23 as low-melting material such as solder (melting point is 200° C. to 300° C.) or the like.

The left and right side walls of the thermite case 26 are bonded to the bus bar tip ends 13*a* and 16*a* by means of the low-melting metals 23, and the first buss bar 11*a* and the second buss bar 19*a* can be electrically connected to each other through the low-melting metals 23 and the thermite case 26.

The low-melting metal 23 is made of at least one metal selected from Sn, Pb, Zn, Al and Cu.

The heating agent 27 is made of metal-oxide powder such as ferric oxide ($Fe_2O_3$) and aluminum powder, and is thermite agent which thermite-reacts by heat of the lead wire 31 to generate high heat. The thermite agent is charged for moisture proofing into the thermite case 26 which is a metal container. Chromic oxide ($Cr_2O_3$), manganese oxide ($MnO_2$) or the like may be used instead of ferric oxide ($Fe_2O_3$).

The heating agent 27 may be made of mixture comprising at least one metal powder selected from B, Sn, Fe, Si, Zr, Ti and Al; at least one metal selected from CuO, $MnO_2$, $Pb_3O_4$, $PbO_2$, $Fe_3O_4$ and $Fe_2O_3$; and at least one additive comprising alumina, bentonite and talc. Such a heating agent is easily is ignited by the ignition 29, and the low-melting metal 23 can be melted within a short time.

A retainer 45 made of resin is disposed in the opening 53 of the resin case 14*b* and in a lower portion of the thermite case 26. A compression spring 39*a* is accommodated in the retainer 45 in a compressed manner. The retainer 45 can be attached to and detached from the resin case 14*b*. When the retainer 45 is attached to the resin case 14*b*, the retainer 45 is disposed in the vicinity or in contact with the thermite case 26, and constitutes an attaching/detaching member which is melted by heat of the heating agent 27.

Figure 8:
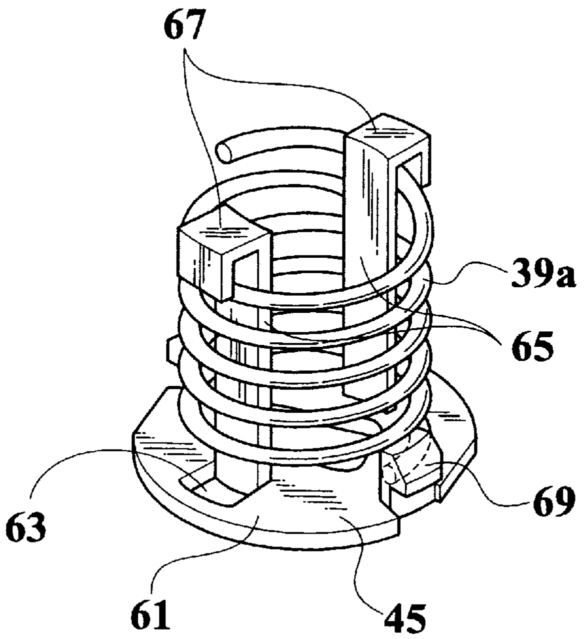
FIG. 8 is a view of a retainer of the circuit breaker of the embodiment before the circuit is interrupted.

As shown in FIG. 8, the retainer 45 comprises a base 61, notches 63 formed in the base 61, retainer bellies 65 embedded uprightly with respect to the notches 63, and a pair of retainer locking portions 67 formed on tip ends of the retainer bellies 65. The pair of retainer locking portions 67 are mounted to the resin case 14*b*.

A compression spring 39*a* which is helically wound around the retainer locking portions 67 is disposed outside the retainer bellies 65. A tip end of the compression spring 39*a* is locked by the retainer locking portions 67. That is, the compression spring 39*a* is sandwiched in the retainer 45 in the compressed state. The first breaker has the above-described structure.

Figure 4B:
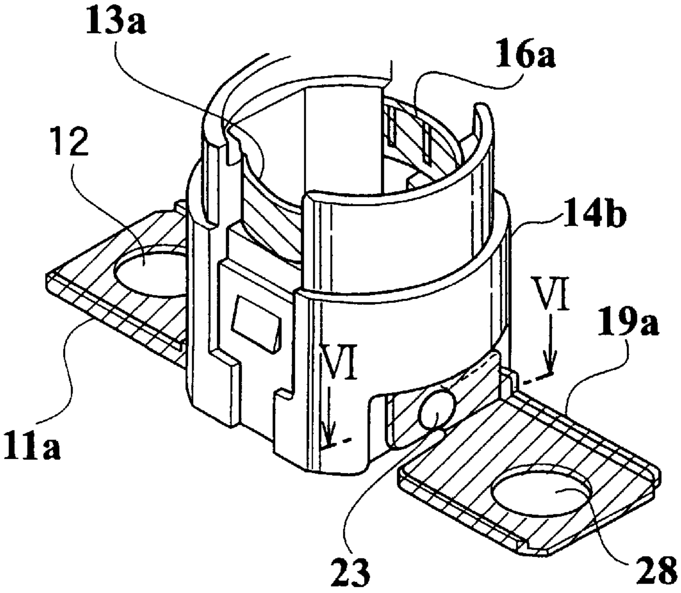

Next, a structure of a second breaker will be explained. In FIG. 4B, a low-melting metal 28 which is a fusible conductor as the second breaker is mounted to an intermediate portion of the second buss bar 19*a*. The low-melting metal 28 is dispersed by heat caused by a current flowing through the second buss bar 19*a*, and if the resistance is increased, the fusible conductor is blown out to interrupt the current. Here, the fusible conductor is a notch of the buss bar including the low-melting metal 28. The low-melting metal 28 functions to blow out the fusible conductor more quickly.

The low-melting metal 28 is made of tin, cadmium, lead, bismuth, indium or alloy thereof.

Figure 6:
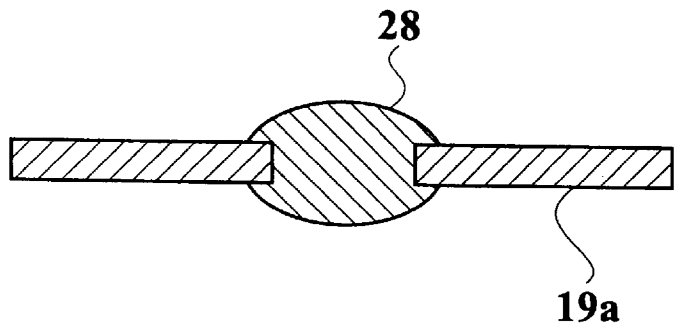
FIG. 6 is a sectional view of the circuit breaker taken along the line VI—VI in FIG. 4.

As shown in FIG. 6, the low-melting metal 28 is mounted to the intermediate portion of the second buss bar 19*a* by heat welding. The low-melting metal 28 may be mounted to each of the first buss bar 11*a* and the second buss bar 19*a*.

Figure 7:
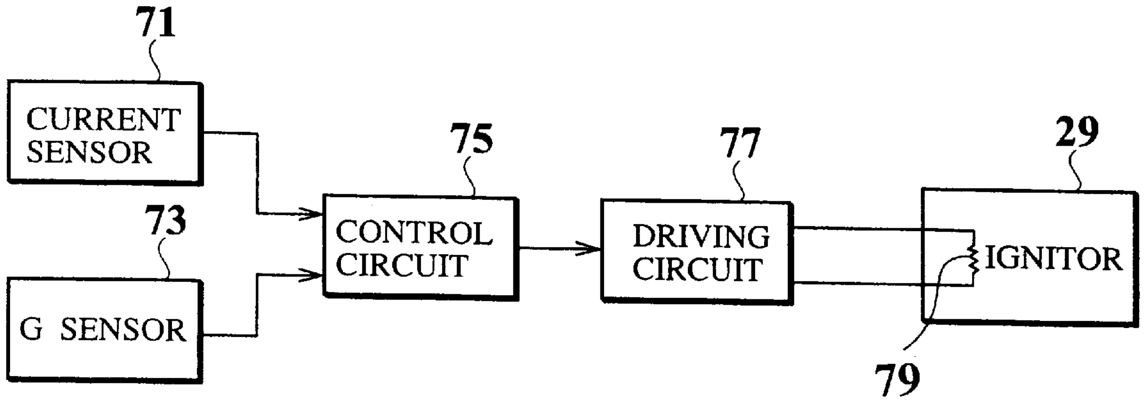
FIG. 7 is a circuit diagram for sending an interrupting signal to an ignitor provided in the circuit breaker.

As shown in FIG. 7, the circuit breaker comprises a current sensor 71 for detecting current flowing through the first buss bar 11*a* and the second buss bar 19*a*, a collision sensor (G sensor) 73 for detecting a collision of the vehicle, a control circuit 75 for outputting a driving control signal to the driving circuit 77 when a current value detected by the current sensor 71 became equal to a threshold value, or for outputting the driving control signal to the driving circuit 77 when an acceleration value detected by the G sensor 73 became equal to or greater than a predetermined value, and the driving circuit 77 for applying an interrupting signal which interrupts the circuit to the heater 79 in the ignitor 29.

The circuit breaker may include a voltage sensor for detecting an excessive voltage and a temperature sensor for detecting a temperature, and may output, to the control circuit 75, an output from the voltage sensor and an output from the temperature sensor.

The interrupting signal is applied to the heater 79 when the detected current value became equal to or greater than the threshold value. The value of a current flowing through the second buss bar 19*a* when the low-melting metal 28 is blown out is set to a value exceeding the threshold value.

Next, the operation of the circuit breaker of the embodiment having the above-described structure will be explained with reference to the drawings.

First, under normal conditions, the first buss bar 11*a* and the second buss bar 19*a* are electrically connected to each other through the low-melting metal 23 and the thermite case 26, and a current is supplied from the battery (not shown) to the load (not shown).

Next, the operation will the current sensor 71, the G sensor 73, the control circuit 75 and the like are under normal conditions and the interrupting signal is sent to the ignitor 29 when the vehicle is under abnormal conditions will be explained. If an abnormal condition occurred in the vehicle and the excessive current flowed through the first buss bar 11*a* and the second buss bar 19*a*, the current sensor 71 detects the current. If the current value detected by the current sensor 71 became equal to or greater than the threshold value, the control circuit 75 outputs the driving control signal to the driving circuit 77, and the driving circuit 77 applies the interrupting signal to the heater 79 in the ignitor 29 in accordance with the driving control signal. Therefore, the current flows to the heater 79 of the ignitor 29 through the lead wire 31.

Then, the ignitor 29 is ignited by heat generated by the current and therefore, the heating agent 27 which is a thermite agent generates a thermite reaction heat according to the following reaction expression:

$$Fe_2O_3+2Al \rightarrow Al_2O_3+2Fe+386.2 \text{ Kcal}$$

Figure 9:
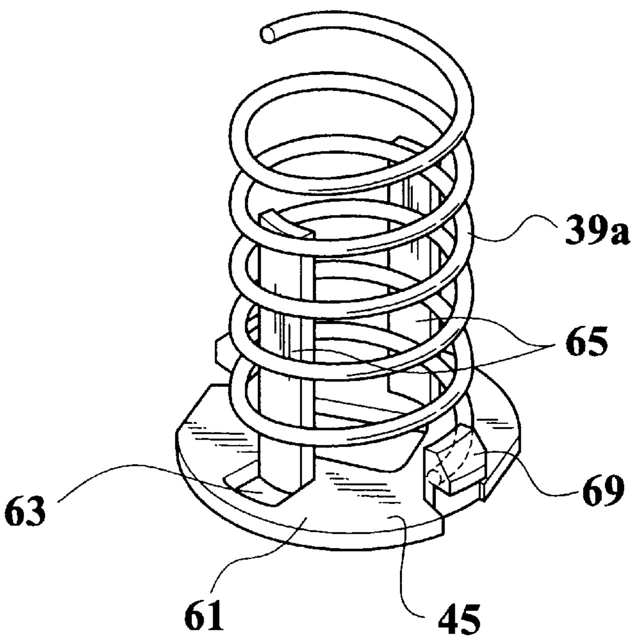
FIG. 9 is a view of the retainer of the circuit breaker of the embodiment after the circuit is interrupted.

The thermite case 26 is heated by the thermite reaction heat, the low-melting metals 23 are heated and melted by the heat of the heating agent 27 and the heat of the thermite case 26. Simultaneously, the resin retainer locking portions 67 which compress and fix the compression spring 39 to the retainer 45 are melted by the heat. As a result, the compression spring 39*a* is expanded, and the thermite case 26 jumps up toward the cap 14*a* as shown in FIG. 9.

Therefore, the electrical connection between the thermite case 26, the first buss bar 11*a* and the second buss bar 19*a* is cut off. That is, the electric circuit of the vehicle is interrupted.

Next, there will be explained the operation when the current sensor 71, the G sensor 73 are damaged, disconnection of the control circuit 75 occurs, the interrupting signal (abnormal signal) is not sent to the ignitor 29 when the vehicle is under the abnormal conditions, and the first breaker is short-circuited.

In this case, the first breaker is not operated. If an excessive current exceeding the threshold value flowed through the second buss bar 19*a*, the low-melting metal 28 provided on the intermediate portion of the second buss bar 19*a* is heated by the excessive current, the low-melting metal 28 is dispersed to the copper alloy of the second buss bar 19*a* so that its resistance is increased. If the resistance is increased, a heating value is further increased, and the fusible conductor is blown out. This fusible conductor is a notch of the buss bar including the low-melting metal 28, and the low-melting metal 28 functions to blow out the fusible conductor more quickly. Therefore, the first buss bar 11*a* and the second buss bar 19*a* are electrically disconnected from each other swiftly, and the electric circuit of the vehicle is swiftly interrupted.

In this manner, according to the circuit breaker of the present embodiment, the abnormal signal is input from the vehicle, the thermite reaction is caused by the heating agent 27 using the heat of the ignitor 29, the low-melting metal 23 and the retainer locking portion 67 are melted by the thermite reaction heat and thus, the compression spring 39*a* instantaneously jumps up. Therefore, it is possible to reliably interrupt the electric circuit of the vehicle within a short time, and to protect the electric parts.

Further, since there are provided two kinds of circuit protecting members, i.e., the first and second breakers, even if the control circuit or the like is out of order and the interrupting signal is not input to the first breaker and the circuit can not be interrupted by the first breaker, the circuit can be interrupted by the second breaker to protect the electric parts.

Further, since the current value when the fusible conductor is blown out is set to be greater than the threshold value, the second breaker is not operated before the first breaker is operated. Moreover, since the two kinds of circuit protecting members can efficiently be disposed, space can be saved, and the costs can be reduced.

Further, since the retainer locking portion 67 is disposed at an inner side with respect to the compression spring 39*a*, the retainer locking portion 67 tends to be tilted inward by the reaction force of the compression spring 39*a*, the thermite case 26 and the retainer 45 come into strong contact with each other. Therefore, heat is excellently transmitted from the thermite case 26 to the retainer 45 and as a result, the retainer locking portion 67 can be melted efficiently.

Furthermore, the compression spring 39*a* can easily be assembled into the retainer 45 only by pushing the compression spring 39*a* into the retainer 45, and the retainer 45 can easily be mounted to the resin case 14*b*.

Since the compression spring 39*a* is held by the retainer 45, no external force is applied to the connected portion between the first buss bar 11*a*, the second buss bar 19*b* and the thermite case 26, i.e., to the low-melting metal 23. Therefore, the reliability of the connected portion can be enhanced.

A sub-assembly between the compression spring 39*a* and the retainer 45 is inserted from a fuse lower surface, i.e., from the opening 53 of the resin case 14*b*. Therefore, the assembling operation of the entire circuit breaker is facilitated. Further, after the circuit is interrupted, if the retainer 45 and the thermite case 26 are replaced by new ones, the resin case 14*b* can be used again as it is as a fuse.

Further, since the cap 14*a* is put on the resin case 14*b*, the thermite case 26 will not jump out from the cap 14*a* when the circuit is interrupted, and this can prevent a burn caused by heat.

Figure 10:
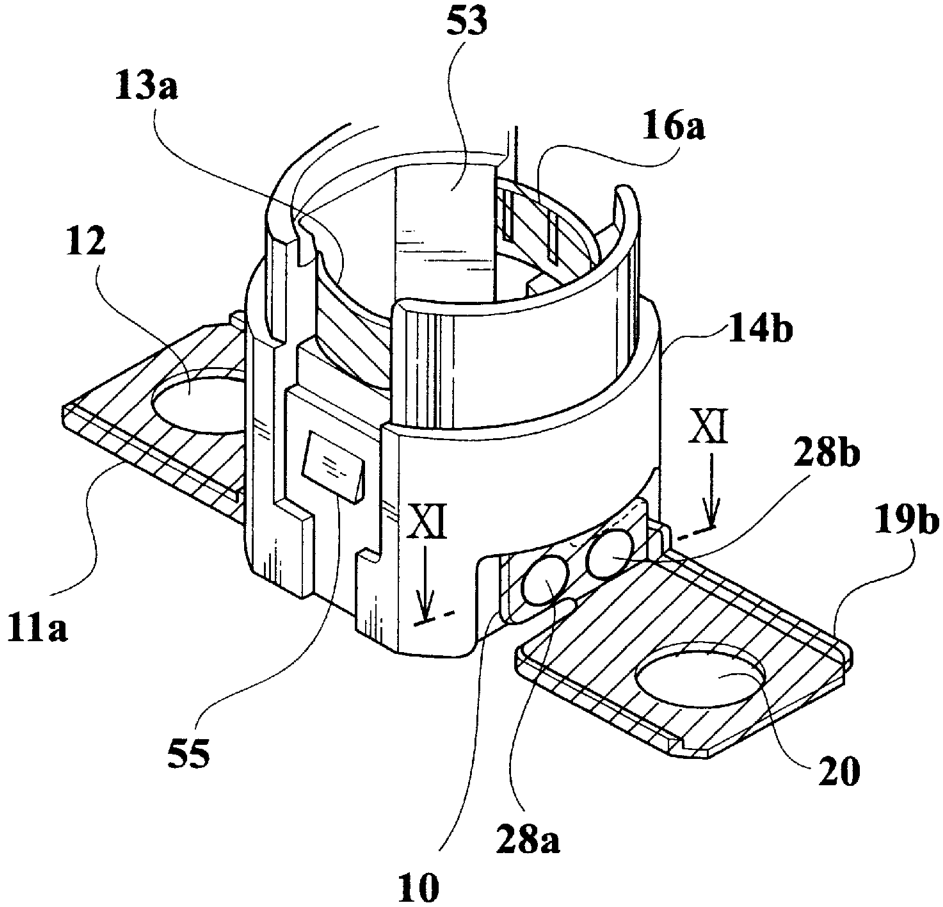
FIG. 10 is a perspective view of an essential portion of a circuit breaker of a first modification.
Figure 11:
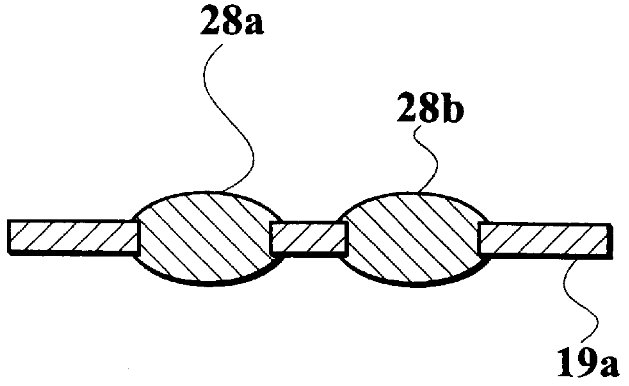
FIG. 11 is a sectional view of the circuit breaker of the first modification shown in FIG. 10 taken along the line XI—XI in FIG. 10.

Next, three modifications of the circuit breaker of the embodiment will be explained. FIG. 10 is a perspective view of an essential portion of a circuit breaker of a first modification. FIG. 11 is a sectional view of the circuit breaker of the first modification shown in FIG. 10 taken along the line XI—XI in FIG. 10.

A circuit breaker of a first modification shown in FIG. 10 is characterized in that a first low-melting metal 28*a* and a second low-melting metal 28*b* are mounted to an intermediate portion of a second buss bar 19*b* by heat welding as the second breaker.

By providing the first low-melting metal 28*a* and the second low-melting metal 28*b* in this manner, the first low-melting metal 28*a* and the second low-melting metal 28*b* are dispersed by heat caused by an excessive current and the resistance is further increased. Therefore, the fusible conductor is blown out and even if the first breaker is not operated, the circuit can be interrupted more quickly.

Figure 12:
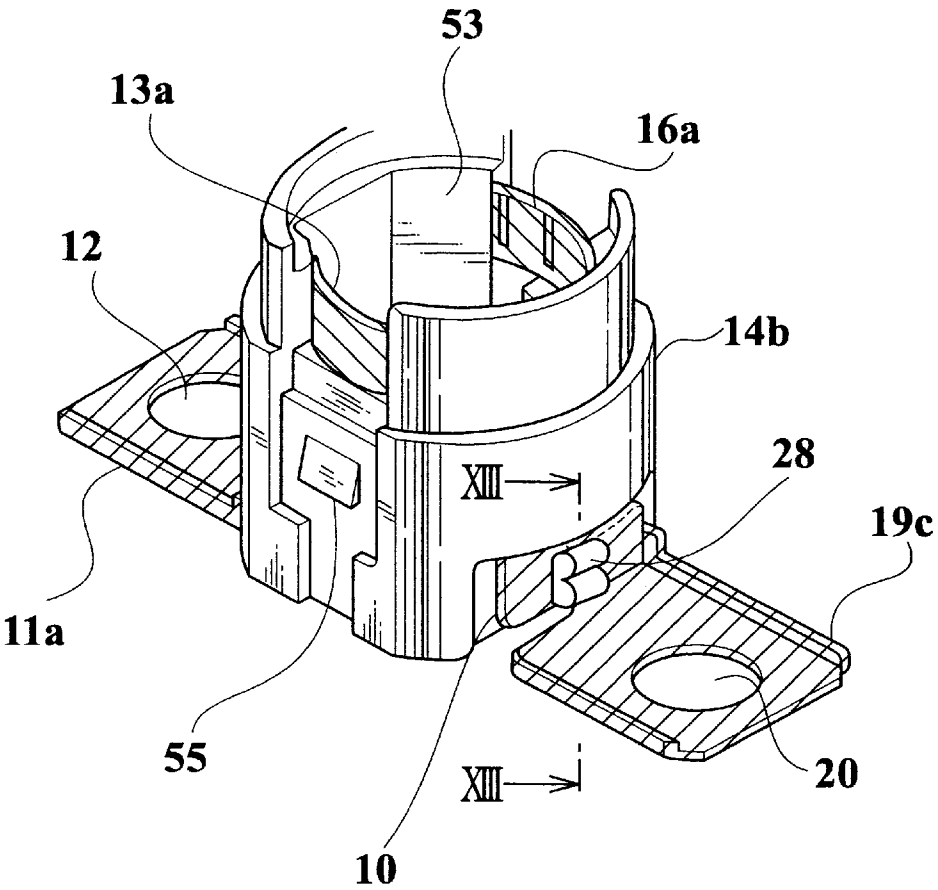
FIG. 12 is a perspective view of an essential portion of a circuit breaker of a second modification.

FIG. 12 is a perspective view of an essential portion of a circuit breaker of a second modification. FIG. 13B is partial sectional view of the circuit breaker of the second modification shown in FIG. 12 taken along the line XIII—XIII in FIG. 12. As shown in FIG. 13B, a low-melting metal 28 caulked by caulking pieces 93*a* and 93*b* is mounted to an intermediate portion of a second buss bar 19*c* as the second breaker.

Figure 13A:
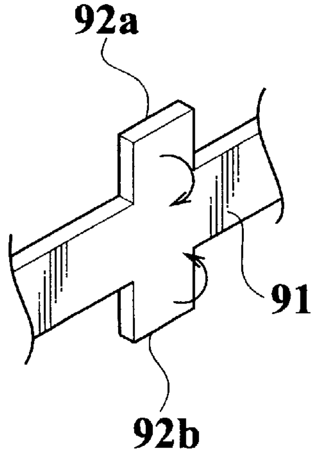
FIGS. 13A and 13B are partial sectional views of the circuit breaker of the second modification shown in FIG. 12 taken along the line XIII—XIII in FIG. 12.
Figure 13B:
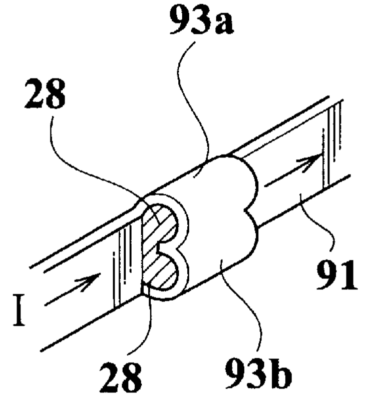

First, as shown in FIG. 13A, a buss bar 91 which is the intermediate portion of the second buss bar 19*c* is formed with a pair buss bar pieces 92*a* and 92*b*. The low-melting metal 28 is disposed on the buss bar 91 between the pair of projecting buss bar pieces 92*a* and 92*b*. The pair of buss bar pieces 92*a* and 92*b* are inwardly bent (in the direction of the arrow in FIG. 13A) into inverted U-shape and caulked, thereby forming the pair of caulking pieces 93*a* and 93*b* as shown in FIG. 13B.

That is, the low-melting metal 28 is caulked by the pair of caulking pieces 93*a* and 93*b* and mounted to the buss bar piece 91. Therefore, according to the circuit breaker of the second modification also, the same effect as that of the circuit breaker of the embodiment can be obtained.

Figure 14:
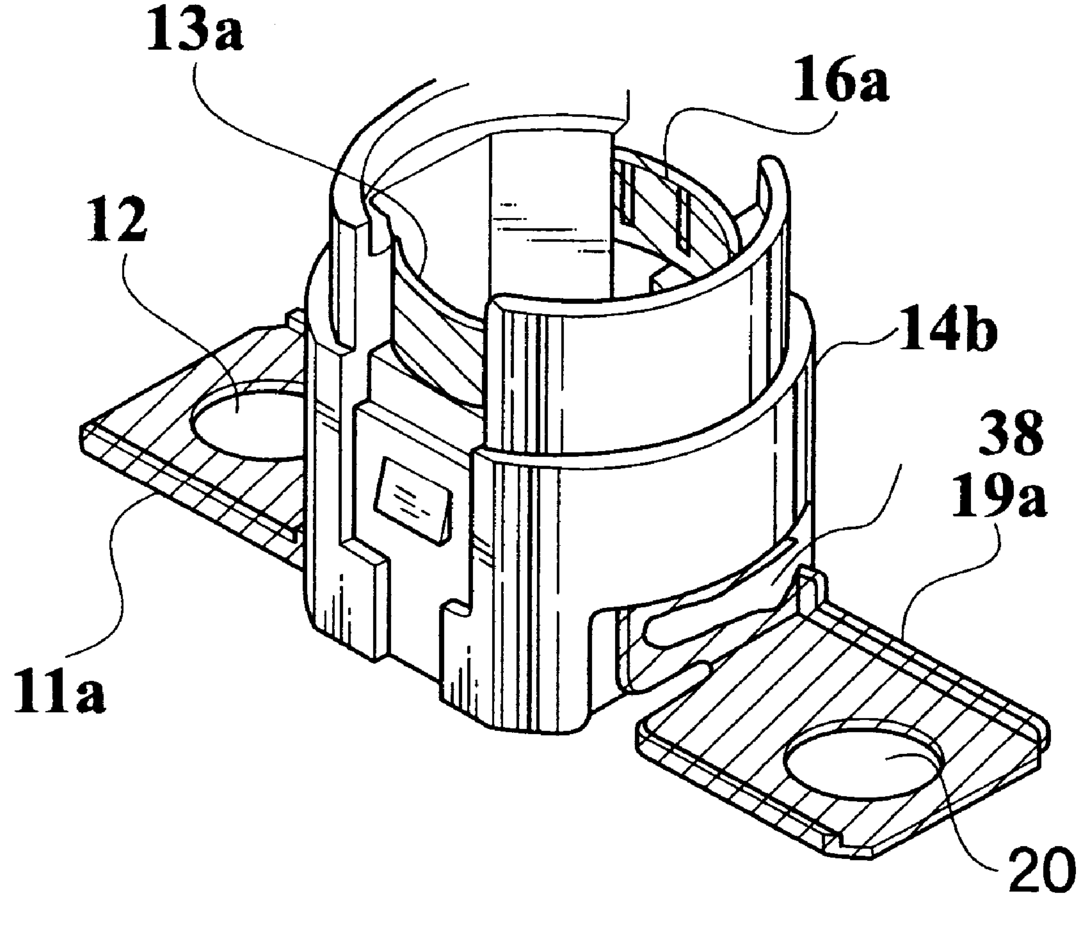
FIG. 14 is a perspective view of an essential portion of a circuit breaker of a third modification.

FIG. 14 is a perspective view of an essential portion of a circuit breaker of a third modification. As shown in FIG. 14, in the case of the circuit breaker of the third modification, the low-melting metal 28 is not provided on the intermediate portion of the second buss bar 19*a*, and only a buss bar notch 38 is formed by cutting the buss bar, thereby forming the second breaker. A resistance value of the buss bar notch 38 is higher than that of portion of buss bar other than the buss bar notch 38. Here, the fusible conductor is only the buss bar notch 38.

According to the circuit breaker of such a third modification, even if the low-melting metal 28 is not added, when the excessive current flows to the buss bar notch 38, since the resistance value of the buss bar notch 38 is higher than that of other portion, the resistance is further increased. Therefore, the buss bar notch 38 which is the fusible conductor is blown out, and even if the first breaker is not operated, the circuit can be interrupted more quickly. Further, the circuit structure is simple and thus, the cost is reduced.

The present invention is not limited to the circuit breaker of the above-described embodiment. Although the compression spring 39*a* and the low-melting metal 23 are provided, and when the retainer 45 and the low-melting metal 23 are melted, the circuit is interrupted in the embodiment, only the retainer 45 may be provided without providing the low-melting metal 23, and when the retainer 45 is melted, the circuit may be interrupted.

Further, although the resin member is used as the retainer 45 in the embodiment, the low-melting metal such as solder (melting point is 200° C. to 300° C.) which is melted by heat of the heating agent 27 may be used. It is of course possible to make various modifications without departing from the spirit and scope of the invention.

What is claimed is:

1. A circuit breaker comprising:

a first breaker including:

a first connecting terminal connected to a power source;

a second connecting terminal connected to a load;

a movable conductive member coming into electrical contact with both said first and second connecting terminals;

wherein said movable conductive member is moved into a position to interrupt the electrical connection between said first and second connecting terminals by an interrupting signal which is input to said first breaker in an abnormal condition; and a second breaker including a notch which is filled with a fusible conductor formed on a portion of at least one of said first and second connecting terminals, wherein said fusible conductor in said notch is blown out due to heat caused by a current flowing through said at least one of said first and second connecting terminals, wherein said second breaker is activated to interrupt the electrical connection between said first and second connecting terminals in case of a failure of said first breaker during the abnormal condition.

2. A circuit breaker according to claim 1, wherein said first breaker comprises:

a heating portion having said conductive member into which a heating is charged;

an ignitor for igniting said heating agent by said interrupting signal;

outer case for accommodating said ignitor and said heating portion;

an extensible resilient member; and a removable member for mounting said resilient member in its compressed state, said removable member being capable of being attached to and detached from said outer case, and being disposed in the vicinity or in contact with said heating portion when said removable member is mounted to said outer case, and said removable member is melted by heat caused by said heating agent.

3. A circuit breaker according to claim 2, wherein said second breaker comprises a low-melting metal as said fusible conductor.

4. A circuit breaker according to claim 3, wherein said fusible conductor is mounted to the intermediate portion of at least one of said first and second connecting terminals by heat welding or caulking.

5. A circuit breaker according to claim 3, wherein said interrupting signal is input to said first breaker when a value of said current became equal to or greater than a threshold value, and said value of said current when said fusible conductor is blown out is set greater than said threshold value.

6. A circuit breaker according to claim 2, wherein said heating portion is formed at its end with a side wall, said side wall and tip ends of said first and second connecting terminals are connected to each other by low-melting members.

7. A circuit breaker comprising:

a first connecting terminal;

a second connecting terminal;

a first breaker including a heating portion movably disposed in electrical contact with each of the first connecting terminal and the second connecting terminal, the heating portion being charged with a heat generation agent and configured to generate heat during an abnormal condition; and a second breaker comprising a fusible notch formed on a portion of at least one of the first and second connecting terminals, the notch configured to be blown out by heat generated from a current flowing through the connecting terminals to disconnect electrical connection between the first and second connecting terminals, wherein, during the abnormal condition, at least one of the first and second breakers is activated to disconnect the electrical connection between the first and second connecting terminals.

8. A circuit breaker according to claim 7, wherein the first breaker further comprises an ignitor for igniting the heat generation agent during the abnormal condition.

9. A circuit breaker according to claim 8, wherein the ignitor is configured to be activated when the magnitude of the current flowing through the terminals exceeds a predetermined threshold value.

10. A circuit breaker according to claim 7, wherein the first breaker further comprises:

an extendable resilient member;

a locking member for mounting the resilient member in a compressed state to a retainer, the locking member disposed near the heating portion, so that, during the abnormal condition, the locking member is melted by the heat generated in the heating portion to allow the resilient member to extend from the compressed state, thereby exerting force onto the heating portion to be displaced.

11. A circuit breaker according to claim 7, wherein the fusible notch is made of a low-melting material.

12. A circuit breaker according to claim 7, wherein the fusible notch is welded or caulked to the portion of at least one of said first and second connecting terminals.

13. A circuit breaker according to claim 7, wherein:

the first breaker has a first threshold value of current for igniting the heat generation agent; and the second breaker has a second threshold value of current for blowing out the fusible notch, the second threshold value set greater than the first threshold value.

14. A circuit breaker according to claim 7, wherein tips of the first and second connecting terminals are connected to an end portion of the heating portion, and a low-melting material is disposed between the tips of the first and second connecting terminals and the end portion of the heating portion.

* * * * *